Figure 9:
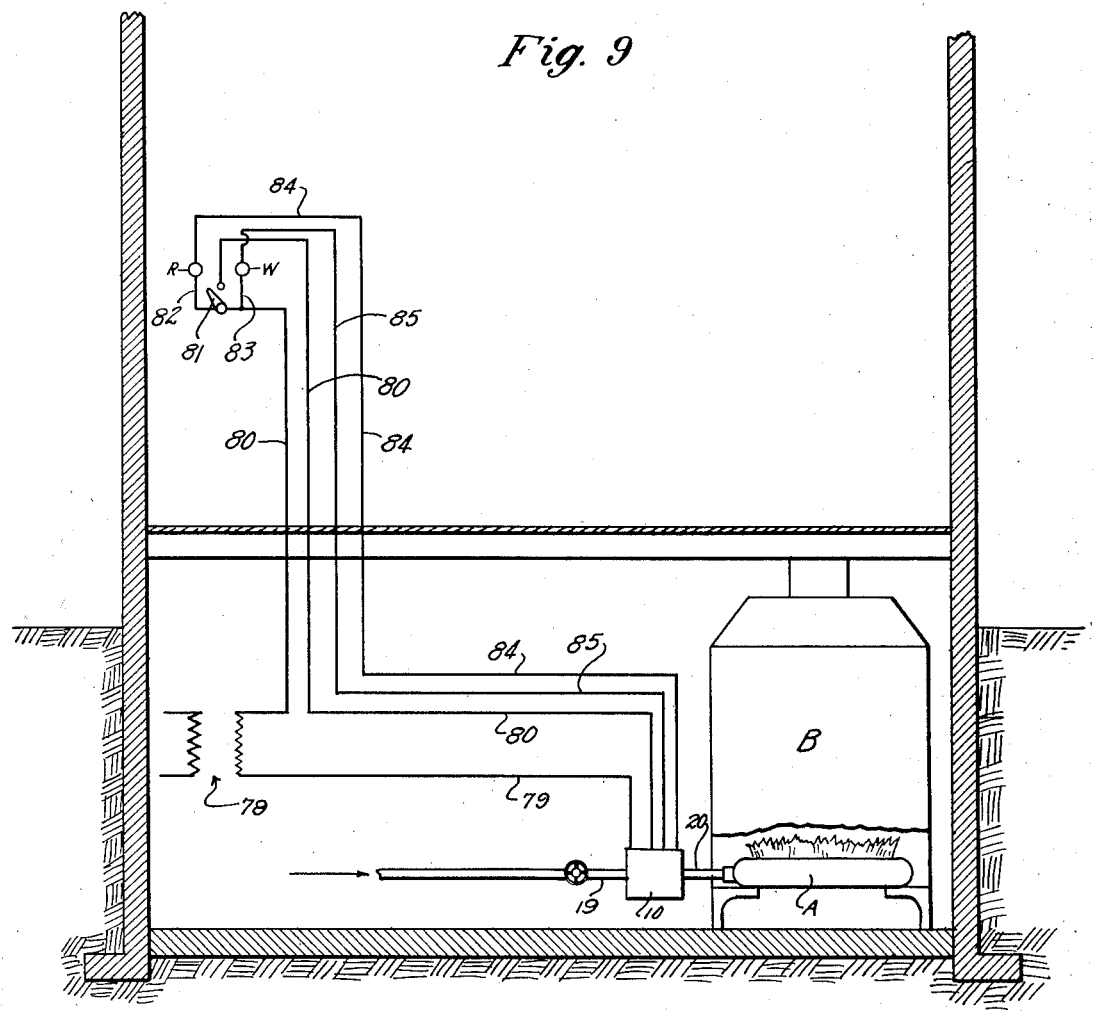

June 5, 1934.　　　　EL ROY L. PAYNE　　　　1,961,386
ELECTRICALLY OPERATED VALVE
Filed Nov. 5, 1921　　　3 Sheets-Sheet 1
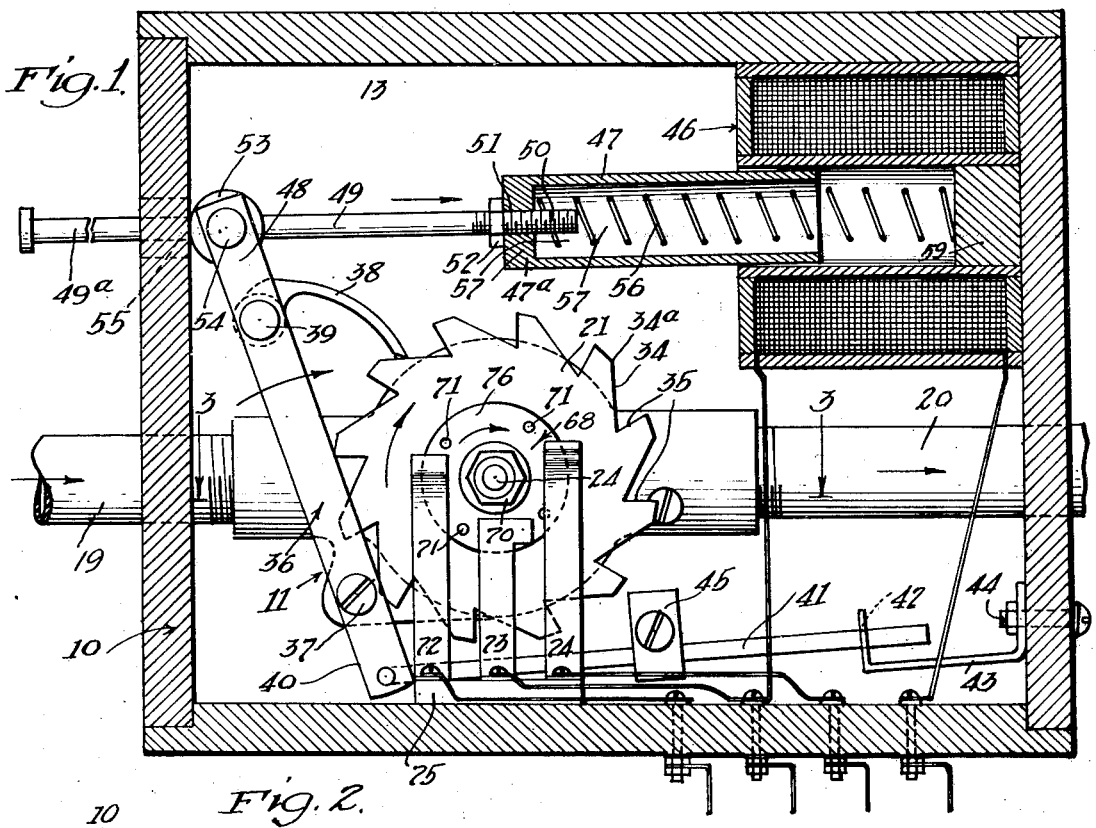
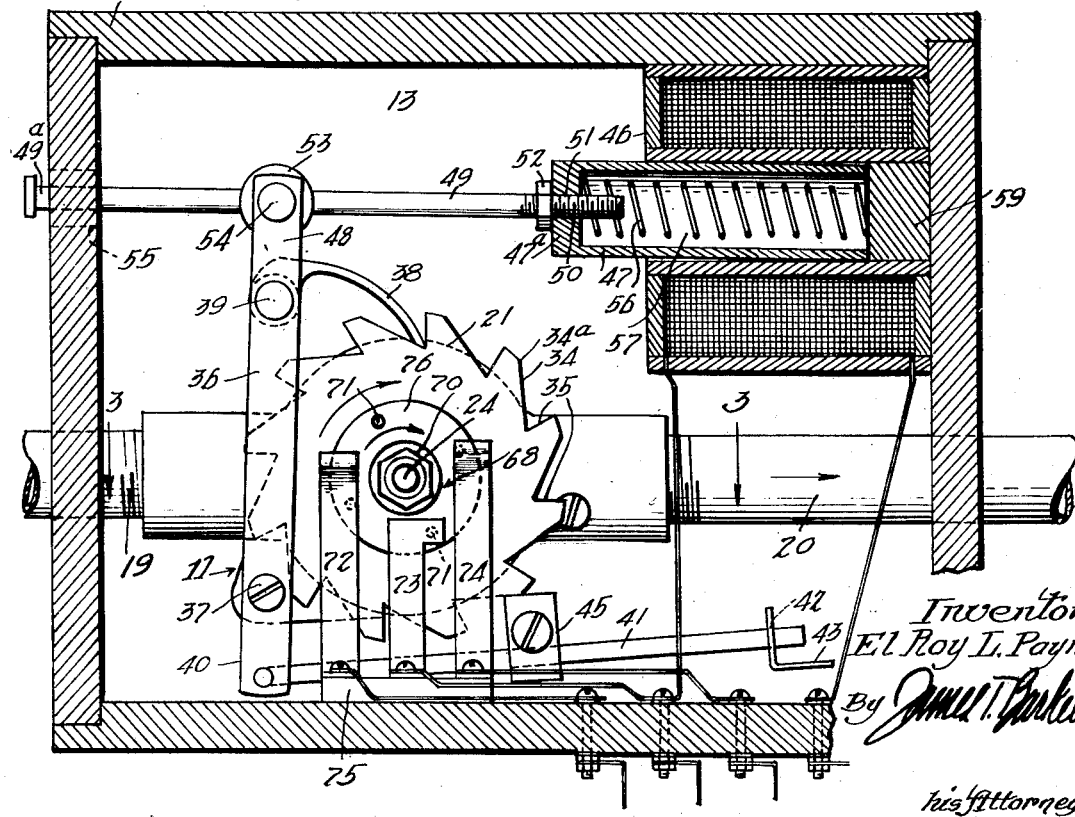
Inventor:
El Roy L. Payne
By [signature]
his Attorney June 5, 1934.  EL ROY L. PAYNE  1,961,386
ELECTRICALLY OPERATED VALVE
Filed Nov. 5, 1921  3 Sheets-Sheet 2
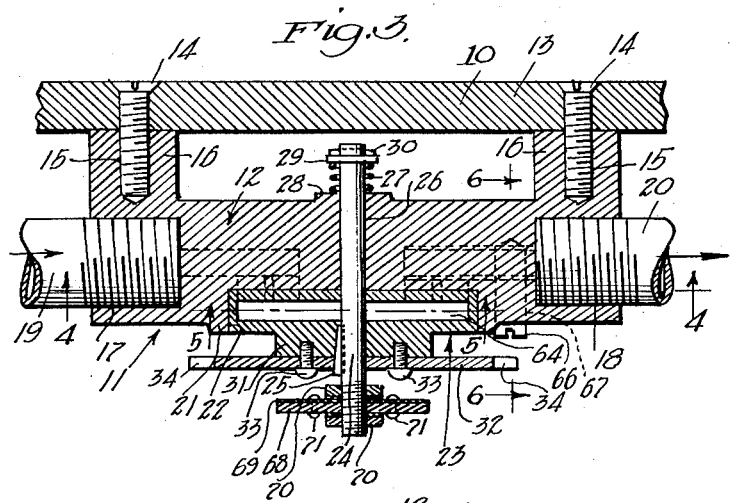

Patented June 5, 1934

1,961,386

UNITED STATES PATENT OFFICE 1,961,386

ELECTRICALLY OPERATED VALVE

El Roy L. Payne, Los Angeles, Calif., assignor to Gas Furnace Control Co., a corporation of California Application November 5, 1921, Serial No. 513,204

22 Claims. (Cl. 137—139)

The invention—hereinafter described in detail in its preferred specific form—comprises an arrangement of mechanisms for electrically operating valves, such as fuel supply valves for gas heaters and the like.

My foremost object is the provision of such an arrangement whereby the valve, located upon the heater or adjacent thereto, may be positively operated from a point remote therefrom, to either increase or diminish the fuel supply to the burners, or turn it on or entirely off. The valve is constructed to take a plurality of different open positions to pass different quantities of gas, the form shown having two such open positions.

An important feature of the invention is the arrangement, in connection with the valve and its actuating mechanism, of electrically operated signals for indicating—at the point of operation remote from the valve—the particular position the valve is in; whether it is passing full or half supply, or turned off entirely.

While the invention will be described hereinafter as operating in connection with a gas heater fuel supply; it is nevertheless to be understood that such description is made merely to best disclose its principles of construction and operation in one preferred form; and is not to be construed as a limitation to this particular use, or such as would prevent its adaptation to any other system of liquid or gas supply where applicable.

Although in its broader aspects my invention need not be so limited, the preferred form of my valve is constructed to move through a definite predetermined cycle of positions beginning with the closed position, followed by the maximum open position, and then by an intermediate open position. This order is important because it is desirable for safe and efficient initial ignition of the burner to open the gas valve to pass a relatively large flow of fuel, a quantity of flow which ordinarily is greater than required for the "low" position of the valve in a house-heating system. By virtue of the valve being limited to this particular order in a predetermined cycle, and by virtue of a momentary pause inherent in the characteristic intermittent operation of my valve, a person desiring to cause the burner to light and operate at a low combustion rate, is automatically forced to take the safe and proper procedure of initiating the flow of fuel at a relatively high rate of flow and to hold that rate momentarily to permit ignition before reducing the flow to the desired low rate of combustion.

In the accompanying drawings, wherein the device is illustrated in its preferred specific embodiment, the several views may be briefly described as follows:

Fig. 1 is a side elevation of the valve mechanism, one side of its case being broken away; Fig. 2 is a view similar to Fig. 1, only showing parts in different positions; Fig. 3 is a longitudinal plan section of the valve, taken as indicated by the line 3—3 of Figs. 1 and 2; Fig. 4 is a vertical, longitudinal section through the valve casing, taken as indicated by the line 4—4 of Fig. 3; Fig. 5 is a vertical section taken through the valve, as indicated by the line 5—5 of Fig. 3; Fig. 6 is a detailed section taken as indicated by the line 6—6 of Fig. 3; Fig. 7 is a diagrammatic layout showing the electrical connections for operating the mechanism and signals; and Fig. 8 is a diagrammatic layout showing the several successive movements of the valve and indicator switch during one cycle of one complete series of movements; and Fig. 9 is a diagrammatic view illustrating the general arrangement of my system, as applied to a gas heater.

Referring now to the drawings, the numeral 10 designates a case or housing for the valve and its immediate actuating mechanism; this case being constructed of any suitable material such as wood or metal, to entirely enclose the mechanism to protect it from dust and other deleterious matter.

The valve, generally designated by the numeral 11, is mounted within the housing 10, as shown; having a valve casing 12, mounted upon the rear wall 13 of the housing by means of suitable screws 14 extending therethrough and engaging internally screw-threaded bores 15, in bosses 16; the latter projecting from the rear face of the casing 12 and preferably formed integral therewith.

The casing 12 has internally screw-threaded bores 17 and 18 extending inwardly from its opposite ends, as shown, for the reception of externally screw-threaded fuel supply pipes 19 and 20, respectively; the former leading from a suitable source of supply (not shown), while the latter leads to the burners A of the heater B.

The body portion of the valve casing 12 is preferably cylindrical, of a diameter slightly larger than the diameter of the pipes 19 and 20; having an enlarged circular portion 21 formed on one side thereof and preferably disposed in a vertical plane, the center or axis of which portion is in a plane with and extends at right angles to the longitudinal axis of the body portion. A circular recess 22—hereinafter termed the valve seat—is cut in the outer face of the portion 21 in which a circular valve 23 is adapted to seat; the latter being rigidly mounted upon a shaft 24 extending through the co-axial centers of the valve 23 and seat 22 in the manner shown. The valve 23 may be secured to the shaft 24, in any suitable manner, as by means of a key 25; the shaft extending through a bore 26, in the casing 12. The valve 23 is held seated in the seat 22 by the shaft 24; the latter being provided at its rear end with an expansile helical spring 27, confined between the rear face 28 of the casing 12 and a collar 29 retained upon the end of the shaft by means of a pin 30. This arrangement provides an easy method of assembling these parts, and also provides a means of yieldingly holding the valve 23 seated, to insure a gas tight joint and take up any wear that may result from continual frictional contact between the contacting parts. Furthermore, it provides for frictional engagement between the valve and seat, thus yieldingly holding the former against movement.

A concentric boss 31 is formed on the outer face of the valve 23, to which a toothed ratchet wheel 32 is rigidly secured, as by means of screws 33; the wheel 32 being preferably concentric with the shaft 24 and valve 23. This ratchet wheel may be constructed of any suitable material, such as fibre or the like; it having notches 34 in its periphery, one side 35 of which are radially disposed and spaced 30° apart, making a total of 12 notches in the wheel, the purpose of which will be hereinafter set forth.

A lever 36 is pivotally mounted adjacent its lower end upon the casing 12—or other suitable place—by means of a pivot pin or screw 37; being positioned in close proximity to and adapted to oscillate in the plane of rotation of the ratchet wheel 32; and carrying a pawl 38—pivotally mounted adjacent its upper end upon a pivot pin 39—to operatively engage the notches 34 in the ratchet wheel. The pawl 38 is preferably constructed of metal, and, being pivotally mounted at one end, the opposite end will fall by gravity into the notches 34.

A portion 40 of the lever 36 extends below the pivotal point 37, to which is pivotally secured one end of a rod 41; the opposite end of this rod having a sliding bearing in an aperture 42 of a bracket 43. The bracket 43 may consist of a strip of flat metal bent to the configuration shown, or any configuration suitable to accomplish the purpose, and secured to the case 10 by means of a bolt 44. A block 45 is longitudinally adjustably mounted upon the rod 41 so as to be moved into and out of engaging position relative to the sides 34a of the notches 34 (see Figs. 1 and 2), during oscillatory movement of the lever 36; the object being to provide a stop for the ratchet wheel 32, to prevent overthrow of the valve by quick action of the lever 36.

A solenoid 46 is rigidly mounted in the upper portion of the case 10, in alignment with the plane of oscillatory movement of the lever 36; this solenoid having a core 47 operatively connected to the upper end 48 of the lever 36 by means of an adjustable connecting rod 49. The rod 49 is adjustably connected to the core 47 by means of a screw threaded end 50 engaging an internally screw-threaded bore 51 in its outer closed end 47a, a suitable lock nut 52 being provided to secure the two in adjusted relative relation. The rod 49 has an enlarged bearing portion 53 formed on it, and a pin 54 extends through a suitable aperture in the upper end 48—of the lever 36— and through a registering bore in this portion 53, to form a pivoted connection between the two. The rod 49 may have an extension 49a extending out through an aperture 55 in the case 10 (shown in dotted lines in Figs. 1 and 2) by means of which the valve mechanism may be manually operative, if desired. The core 47 is designed to be so adjustable on the rod 49, that when the solenoid is energized the lever 36 will be moved just far enough (in the direction indicated by the arrow in Fig. 1) to rotate the valve through an arc of 30°, or one-twelfth of a revolution.

The core 47, and also the lever 36—through the medium of the connecting rod 49—are normally held in the position shown in Fig. 1 by means of an expansible helical spring 56, extending into a bore 57 in the core 47 and confined between the closed end 47a thereof and the plug 59 of the solenoid. In this particular position of the device the solenoid is in horizontal position and the spring 56 is needed to move the parts to normal position. If the device is placed or arranged so that the solenoid is vertical, then gravity may do this work.

Referring now particularly to Figs. 4 and 5, a pair of smaller inlet bores 60 and 61 extend inwardly from the inner end of the bore 17, towards the seat 22, in the casing 12, and a short distance beyond its perimeter; the bore 61 being approximately twice the size of the bore 60. Each have outlet ports 60a and 61a, respectively, of corresponding areas, communicating with the valve seat 22. Similar bores 62 and 63, disposed in reverse order to the bores 60 and 61, likewise extend from the inner end of the bore 16 towards the seat 22; the bore 63 being also approximately twice the size of the bore 62, and each likewise having outlet ports 62a and 63a, respectively, of corresponding areas. It will be noted that the larger ports 61a and 63a of the larger bores 61 and 63, respectively, are diametrically opposed while the smaller ports 60a and 62a of the smaller bores 60 and 62, respectively, are also diametrically opposed; the ports 60a and 61a, and the ports 62a and 63a being respectively spaced 30° apart, or one-twelfth of a circle. The ports 60a and 62a are designed to be substantially one-half the area of the ports 61a and 63a, the same relative sizes existing between the bores 60 and 62 and 61 and 63 so that the ports 61a and 63a will pass sufficient gas to permit the burners to operate at full capacity while the ports 60a and 62a will pass only sufficient gas to enable them to operate at substantially half their capacity.

The valve 23 (shown in detail in Figs. 3 and 5) is circular, as hereinbefore stated, to properly seat and be rotatable in the seat 22; the center of this valve being hollow or open as at 64, the only openings into which are the ports 65. Ports 65 correspond in area to the ports 61a and 63a, in the seat 22; these ports being positioned diametrically opposite in the rear wall 23a of the valve and spaced 90° apart. Upon rotation of the valve 23 in the seat 22 in the direction indicated by the arrows in the several figures of the drawings, the ports 65 will successively register with the ports 61a and 63a or 60a and 62a, passing gas from the pipe 19 through either of the ports 60a or 61a through the opening 64 in the valve 23, out through either of the corresponding ports 62a or 63a, and into the pipe 20.

The smaller outlet port 62 may be restricted to further limit the supply of gas passing therethrough to the burners by means of a cap screw 66, screw-threadedly engaging an internally screw threaded bore 67 communicating with the bore 62, in the manner clearly illustrated in Fig. 6.

A switch mechanism for indicating the several positions of the valve 23, relative to the inlet and outlet ports in the valve casing, by closing an electric signal circuit, consists of a circular disk 68 of insulating material, backed by a metallic disk 69, rigidly mounted together upon the outer end of the shaft 24—forward of the ratchet wheel 32—by means of suitable lock nuts 70, in the manner clearly illustrated in Fig. 3. Contact points, in the form of small rivets 71, extend through the disks 68 and 69 and are electrically connected with each other by contact with the plate 69. It will be noted that through plate 69, the rivets or pins 71 are also electrically connected with the shaft or stem 24. The contacts 71 are arranged on the disk 68 in diametrically opposed relation and spaced 90° apart, as shown in Figs. 1 and 2. A plurality of resilient contact arms 72, 73, and 74 are rigidly mounted at their lower ends upon the bottom of the casing 10, being insulated therefrom by means of a block of insulation 75; these arms extending upwardly so their upper ends are in yielding contact with the outer face 76 of the disk 68, and which ends are so disposed that they will be wiped by the contacts 71 during rotation of the valve. They are furthermore so positioned that only two of them will be in contact with any two of the contact points 71 at one time, the contact end of the arm 73 being always in contact with one of the points 71 while either of the arms 72 or 74 is in contact with another of the contacts 71; the object being to operate two signal lights upon a 3-wire circuit in the manner hereinafter described.

Referring first to the wiring diagram illustrated in Fig. 7, illustrating in diagrammatic form the solenoid 46, disk 68 with the contacts 71 thereon, and the contact arms 72, 73 and 74, electrically connected to a switchboard, generally designated by the numeral 77; the latter adapted to be mounted at a point remote from the valve mechanism hereinbefore described. The solenoid 46 is electrically connected to a transformer 78 (the mechanism herein described being adapted to be operated from an ordinary lighting circuit through a transformer) by means of wires 79 and 80; a switch 81, upon the switch board 77, being interposed in the wire 80 by means of which the circuit is closed. Closing of the switch 81 will energize the solenoid, moving the core 47 towards the plug 59 against the action of the spring 56; thereby moving the lever 36 in the direction indicated by the arrow in Fig. 1 through the medium of the connecting rod 49. During this movement the pawl 38 engages the radial side 35 of one of the teeth 34, thereby rotating the ratchet wheel 32 in the direction indicated by the arrow and rotating the valve 23 one twelfth of a revolution in the seat 22. The letters R and W designates red and white lights mounted upon the switchboard 77; these lights being connected on one side to the transformer 78 by wires 82 and 83, respectively; the red light being connected on its other side to the contact arm 74 by means of a wire 84, while the white light is connected to the contact arm 72 through wire 85; the arm 73 being connected to the opposite side of the transformer by means of a wire 86. Thus when the valve mechanism is actuated by the solenoid, as hereinbefore stated, the disk 68 is rotated in the direction indicated by the arrow, causing the contacts 71 to be moved into successive positions to first engage the contact arms 73 and 74, closing the circuit and energizing the light R; its next movement moving the contacts 71 to engage the arms 72 and 73 and closing the circuit and energizing the light W.

In connection with the description of movements of the valve 23 and disk 68, to be hereinafter made, it will be assumed that the latter is so mounted in relation to the valve 23 that when the diametrically opposed ports 65 thereof are in register with the diametrically opposed ports 61a and 63a i. e., when the gas is full on, two of the contacts 71 will be in the position to engage the contact arms 73 and 74, causing the circuit to energize the red light, indicating the gas to be full on; and when the diametrically opposed ports 65 are in register with the ports 60a and 62a, the contacts 71 will have moved to their next successive position to engage the contact arms 72 and 73, causing the circuit to energize the while light, thus indicating the gas to be half on. The next successive movement of the mechanism will carry the contacts 71 to the position shown in Figs. 1 and 7, where none of them will be in engagement with any of the switch arms 72, 73 or 74, and the red and white lights being dark will indicate the gas to be entirely off. In the latter position none of the ports 65, of the valve 23, are in register with either of the ports 60a and 62a, or 61a and 63a of the valve casing.

Referring now to the diagram shown in Fig. 8, the several figures shown in the column A represent the successive movements of the valve 23 relative to its seat 22; while the figures represented in the column B show the successive movements of the disk 68 relative to the contact arms 72, 73 and 74. In the diagram A—1, ports 65 are shown to be in a position where none of them are in register with any of the ports 60a, 62a or 63a; while the disk 60a is shown to be in its corresponding position where none of the contacts 71 are in engagement with any of the contact arms 72, 73 or 74. In this position it will be remembered that the gas is shut off entirely as will be indicated by neither of the lights on the switchboard being energized. Closing of the switch 81 will energize the solenoid to draw the core 47 towards the plug 59 against the action of spring 56 (from the position shown in Fig. 1 to that shown in Fig. 2); thus rotating the valve 23, in the direction indicated by the arrows in the several figures, through the medium of the core 47, connecting rod 49, lever 36, and pawl 38 engaging one of the notches 34 of the wheel 32. This movement will rotate the valve 23 through an arc of 30°, or one-twelfth of a revolution, and the disk 68 through a similar arc; from the positions shown in the diagrams A—1 and B—1, to their respective positions shown in diagrams A—2 and B—2. In the latter position, the valve ports 65 are shown to be in register with the ports 61a and 63a, the gas being full on, while the contacts 71 are in engagement with the contact arms 73 and 74, thus energizing the red light R. After such movement as just described, the lever 36, rod 49 and core 47 are returned to their normal inoperative positions (from that shown in Fig. 2 to that shown in Fig. 1) by the action of spring 56.

If it is then desired to reduce the amount of gas passing to the burners, or operate the heater at half capacity, the switch 81 is again closed, similarly energizing the solenoid and rotating the valve 23 through another one-twelfth of a revolution, thereby moving the opposed ports 65 into registration with the ports 60a and 62a, and the disk 68 so that contacts 71 will engage the contact arms 72 and 73, energizing the white light; the elements moving from the positions shown in diagrams A—2 and B—2 to those shown in diagrams A—3 and B—3, respectively. The next closure of the switch 81 and energization of the solenoid 46, will cause rotation of the valve 23 and disk 68 through another one-twelfth of a revolution, i. e., from the positions shown in diagrams A—3 and B—3 to those shown in diagrams A—1 and B—1, respectively; thereby entirely shutting off the gas supply to the burners. In this position the contacts 71 not being in engagement with any of the contact arms 72, 73 or 74, the signal lights will not be energized, thus indicating that the gas is turned off entirely.

The ports 65 of the valve 23 being diametrically opposed and 90° apart and the inlet and outlet ports 60a and 61a, and 62a and 63a, respectively, being diametrically opposed and 30° apart, permit the valve to be successively actuated from its entirely off position to full on, thence half on, and off again, through three successive energizations of the solenoid 46. In case the ports 65 are in register with the ports 60a and 62a, where the gas is only half on, and it is desired to turn it full on, it is only necessary to make two successive closures of the switch 81 thereby rotating the valve successively from the position shown in diagram A—3, through that shown in diagram A—1, to that shown in diagram A—2; the disk 68 likewise rotating from the position shown in diagram B—3 through that shown in diagram B—1 to that shown in diagram B—2, and correspondingly indicating these movements through the red and white lights.

I desire to point out the importance of the intermittent operation of my valve and of certain "lost motion" of the control mechanism between movements affecting the valve proper. These structural and functional features provide a minimum lag or time interval between movements of the valve itself, so that when the valve is turned to the maximum open position for the initial ignition of the burner by a burner pilot light, the required time interval to permit such ignition before reducing the gas flow, is automatically provided, even when the control mechanism is actuated by an impatient operator. Most of this "lost motion" is in the return movement of the solenoid core 47 under actuation of spring 56, and the time interval is accounted for, in part, by such factors as inertia, frictional resistance of the moving parts, and the tendency of the outwardly moving core to engender a vacuum in its wake. Until this reverse movement progresses sufficiently to carry pawl 38 into engagement with a new tooth of the ratchet wheel, closure of control switch 81 results merely in a repetition of the series of movements that has no effect on the valve proper. The operator is apprised of this state of affairs by virtue of the signal lights failing to change, and is compelled to wait for one cycle of the control series of movements to be fully completed before a new control series that is effective can be initiated. It may be said, then, that a complete cycle of movements in the control mechanism is required to actuate the valve proper through one step in the valve cycle, it being necessary to initiate a separate control cycle for each step in the valve cycle. In the sense that the control mechanism cannot be operated to affect the valve until this control cycle is practically completed, it may be further said that the valve is non-responsive to prematurely initiated controlled cycles.

To provide desirable variation in fuel flow, preferably my valve is constructed to pass in a single movement from one open position through a closed position to a second open position. By virtue of such an arrangement I minimize the exposure to the fuel stream of coacting valve surfaces. Corrosion incidental to such exposure substantially shortens the life of any valve of the usual type constructed to vary fuel flow by merely changing the degree of overlap of two apertured valve members. It will be noted that in a valve of the latter type there is no interruption in the fuel flow occasioned by changing the volume of flow, whereas in my preferred construction fuel flow at the valve is actually cut off in turning the valve from a "high" position to a "low" position. The transition through the intermediate closed position is, however, relatively rapid, and, while the flow of fuel momentarily ceases at the valve itself, pressure at the burner is, nevertheless, maintained sufficiently to support the burner flame during such transition. That the valve may be momentarily closed without extinguishing the flame is explained by the fact that pipe 20 and the chamber of burner A combine to serve, in effect, as a pressure reservoir that delays the drop of pressure at the burner holes when the valve is suddenly closed. Obviously, the greater the pressure in such reservoir just prior to such a sudden closing of the valve, the longer the burner flame will be sustained after the valve closes. A further reason, then, becomes apparent from my arranging the valve to proceed from a "high" first open position to a "low" subsequent open position. By such a sequence, I not only provide a relatively large initial flow of gas to insure ignition of the burner, but I also provide for sufficiently high pressure between the valve and the burner holes to insure sustaining the burner flame during the transition from the first open position to the second open position. Moreover, the aforementioned lag inherent in my control mechanism provides a minimum time interval between valve movements in which flame-sustaining pressure may be built up.

While I have herein shown and described the preferred embodiment of my invention, it is nevertheless to be understood that I reserve the right to make any changes or modifications in structure which may appear to those skilled in the art, and which come within the scope of the appended claims.

Having described a preferred form of my invention, I claim:

1. In combination, a valve casing having a plurality of inlet ports of relatively different sizes spaced 30° apart and diametrically opposed complementary outlet ports, a rotatable valve member having diametrically opposed ports spaced 90° apart and adapted to register with said complementary inlet and outlet ports, means to actuate said valve member to cause said ports to register to pass gas in different quantities, and signal means in connection with said valve to indicate its position.

2. In combination, a valve casing having a plurality of inlet ports of relatively different sizes spaced 30° apart and diametrically opposed complementary outlet ports, a rotatable valve member having diametrically opposed ports spaced 90° apart and adapted to register with said complementary inlet and outlet ports, means to intermittently actuate said valve member through arcs of 30° to cause said ports to register to successively pass gas in different quantities, and signal means in connection with said valve to indicate its position.

3. In a heating system, the combination of: a gas heater; valve means controlling the flow of gas to said heater, said means being adapted to be moved through a definite predetermined cycle of positions, the first open position passing a large quantity of gas relative to a subsequent open position; and control means adapted to cause said valve to move from one position to another in the cycle, said means being timed to permit initial ignition in the heater at the first open position of the valve.

4. In a heating system, the combination of: a gas heater; valve means controlling the flow of gas to said heater, said valve means being adapted to be moved through a definite predetermined cycle of positions, the first open position passing a large quantity of gas relative to a subsequent open position; and a remote control mechanism adapted to progress automatically through a predetermined cycle of movements to advance the valve one step in the valve cycle, said control mechanism being adapted for manual initiation of the control cycle and to be operatively disconnected from the valve during a substantial portion of said control cycle to provide a sufficient interval to permit initial ignition in the heater at the first open position of the valve.

5. In a heating system, the combination of: a gas heater; valve means controlling the flow of gas to said heater, said means being adapted to be moved through a definite predetermined cycle of positions, the first open position passing a large quantity of gas relative to subsequent positions; a remote control mechanism adapted when manually started to progress automatically through a cycle comprising two series of movements; and a connecting member associated with the valve means movable by the remote control mechanism to actuate the valve one step in the valve cycle during a complete cycle of the control mechanism, said member being adapted to be operatively disconnected from the valve at the beginning of the second series of movements in the control cycle and to remain so disconnected until completion of said second series of movements in the control cycle.

6. In a heating system, the combination of: a gas heater; valve means controlling the flow of gas to said heater, said means being adapted to be moved through a definite predetermined cycle of positions, the first open position passing a large quantity of gas relative to subsequent positions; a remote control mechanism adapted to progress automatically through a manually initiated cycle of movements; and a reciprocating member included in the control mechanism driven in one direction during the first part of the control cycle, thereby actuating the valve through one step in the valve cycle, and moving in the opposite direction operatively free of the valve during the remainder of the control cycle, said member and valve being adapted to remain mutually independent during a control cycle initiated to interrupt a previous control cycle.

7. In a heating system, the combination of: a gas heater; valve means controlling the flow of gas to said heater, said means being adapted to be moved through a definite predetermined cycle of positions, the first open position passing a large quantity of gas relative to subsequent positions; a remote control mechanism adapted to progress automatically through a manually initiated cycle of movements; a ratchet operatively connected to the valve; a pawl driven in one direction during the first part of the control cycle in engagement with the ratchet to actuate the valve one step in the valve cycle, said pawl being driven in an opposite direction operatively disconnected from the ratchet during the latter part of the control cycle, said pawl and ratchet being adapted to remain operatively disconnected until the completion of the control cycle.

8. In a heating system, the combination of: a gas heater; valve means controlling the flow of gas to said heater, said means being adapted to be moved through a definite predetermined cycle of positions, the first open position passing a large quantity of gas relative to subsequent positions; a remote control mechanism adapted to progress automatically through a manually initiated cycle of movements; a ratchet operatively connected to the valve and having teeth spaced to correspond to the rotation required to move the valve one step in the valve cycle; and a pawl operatively associated with the ratchet, and connected to the control mechanism, said pawl being driven by the control mechanism during the early part of the control cycle in one direction in engagement with a tooth of the ratchet a distance greater than the spacing between two teeth and less than twice said spacing, said pawl being driven in the reverse direction during the latter part of the control cycle.

9. A remote control valve comprising, in combination: a valve including a casing member and a valve member therein adapted for intermittent rotation in one direction, through a definite, predetermined cycle of off and on positions, one of said members having a plurality of spaced discharge ports therein, of relatively different sizes, and the other member having one or more ports adapted to register therewith to pass gas in different quantities; a plurality of contacts arranged for movement in timed relation with the valve member and positioned to correspond with the several open positions of the valve; a plurality of complementary contacts supported adjacent said first mentioned contacts to form an electric circuit by engagement therewith, said first and second mentioned contacts being positioned for successive engagements corresponding with the several open positions of the valve; a remote control mechanism adapted to progress automatically through a manually initiated cycle comprising a series of two movements, including a ratchet wheel operatively connected with the valve and a pawl operatively associated with the control mechanism, said control mechanism being arranged to move the valve one step in the valve cycle, from closed position to the first open position, from an open position to a subsequent open position, and from the last open position to closed position, and to correspondingly move said movable contacts, during one movement of its cycle, and to be operatively disconnected during the other movement of its cycle.

10. A remote control valve comprising, in combination: a valve including a casing member and a valve member therein adapted for intermittent rotation in one direction, through a definite, predetermined cycle of off and on positions, one of said members having a plurality of spaced discharge ports therein, of relatively different sizes, and the other member having one or more ports adapted to register therewith to pass gas in different quantities; a plurality of contacts arranged for movement in timed relation with the valve member and positioned to correspond with the several open positions of the valve; a plurality of complementary contacts supported adjacent said first mentioned contacts to form an electric circuit by engagement therewith; said first and second mentioned contacts being positioned for successive engagements corresponding with the several open positions of the valve; a remote control mechanism adapted to progress automatically through a manually initiated cycle comprising a series of two movements, a ratchet wheel operatively connected with the valve, having teeth spaced to correspond to the rotation required to move the valve one step in the valve cycle, from closed position to the first open position, from an open position to a subsequent open position, and from the last open position to the closed position; said control mechanism being arranged to advance the ratchet a distance of one tooth during each cycle of movements.

11. In a heating system, the combination of: a gas heater; a valve including a casing member and a valve member therein adapted for intermittent rotation in one direction, through a definite, predetermined cycle of off and on positions, one of said members having a plurality of spaced discharge ports therein, of relatively different sizes, and the other member having one or more ports adapted to register therewith to pass gas in different quantities; a plurality of contacts arranged for movement in timed relation with the valve member and positioned to correspond with the several open positions of the valve; a plurality of complementary contacts supported adjacent said first mentioned contacts to form an electric circuit by engagement therewith; said first and second mentioned contacts being positioned for successive engagements corresponding with the several open positions of the valve; electro-responsive signal means, remote from said valve means, for differently indicating to a person remote from said valve means, each different open position of the valve; electric conductors connecting said contacts with said electro-responsive means; a remote control mechanism adapted to progress automatically through a manually initiated cycle, comprising a series of two movements, including a ratchet wheel operatively connected with the valve and a pawl operatively associated with the control mechanism; said control mechanism being arranged to move the valve one step in the valve cycle, from closed position to the first open position, from an open position to a subsequent open position, and from the last open position to closed position, and to correspondingly move said movable contacts, during one movement of its cycle, and to be operatively disconnected during the other movement of its cycle.

12. In a heating system, the combination of: a gas heater; valve means controlling the flow of gas to said heater, said means being adapted to be moved through a definite, predetermined cycle of positions; a remote control mechanism adapted when manually started to progress automatically through a cycle comprising two series of movements; and a connecting member associated with the valve means movable by the remote control mechanism to actuate the valve one step in the cycle during a complete cycle of the control mechanism, said member being adapted to be operatively disconnected from the valve at the beginning of the second series of movements in the control cycle and to remain so disconnected until completion of said second series of movements in the control cycle.

13. In a heating system including a fuel burner and a remote control station, the combination of: a valve controlling the fuel delivery to the burner, said valve being adapted to be moved through a definite predetermined cycle of open and closed positions; an electrically energized valve-actuating mechanism adapted to progress automatically through a predetermined cycle of movements to advance the valve one step in the valve cycle, said control mechanism being adapted to be operatively disconnected from the valve during a substantial portion of said control cycle to provide a pause at an initial open position of the valve to permit ignition of the burner; a main circuit to energize said valve-actuating mechanism; a switch in said main circuit at said remote control station; a plurality of lamps visible at said remote control station to indicate different positions of the fuel valve; a corresponding plurality of secondary circuits in parallel with the main circuit for energizing said lamps; and switching means synchronized with the fuel valve to open and close said secondary circuits successively at different positions of said valve.

14. In a heating system, the combination of: a gas burner having burner holes; a fuel pipe supplying the burner; a valve in the pipe adapted to move in a cycle from a closed position through a series of open positions and to close momentarily between said successive open positions, said burner and fuel pipe between the valve and burner providing sufficient reservoir capacity between the valve and the burner holes to provide flame-sustaining pressure during the momentarily closed position of the valve; a remotely controlled means for actuating the valve; and means to indicate the position of the valve at a remote station.

15. In a heating system, the combination of: a gas burner having burner holes; a fuel pipe supplying the burner; a valve in the pipe adapted to move in a cycle from a closed position through a series of open positions, the first open position passing a greater flow of gas than a subsequent open position, the valve closing momentarily between said successive open positions, said burner and fuel pipe between the valve and burner providing sufficient reservoir capacity between the valve and the burner holes to provide flame-sustaining pressure during a momentarily closed position of the valve; a remotely controlled means for actuating the valve in one movement from the closed position to the first open position, or from one open position through a momentarily closed position to a subsequent open position, or from the last open position to the first closed position, said means being adapted to pause at the first open position a minimum interval to insure ignition of the burner by the pilot light; and means to indicate the position of the valve at a remote station.

16. A remote control valve comprising in combination a valve adapted for continuous rotation in one direction, an operating stem connected to the valve to rotate therewith, members rotating with said stem, contacts supported adjacent the stem to form an electric circuit upon engagement with said members, electrical means to rotate the valve step-by-step and cause the contacts to make and break an electric circuit at various positions of the valve.

17. In a heating system, the combination of: a gas heater; valve means controlling the flow of gas to said heater, said means being adapted to assume a low position, admitting a relatively small flow of gas to said heater, or a high position, admitting a relatively large flow of gas to said heater, or an "off" position, entirely shutting off the flow of gas to said heater; means by which a person at a point remote from said heater may cause said valve to assume any one of said positions; and means independent of said last named means for differently indicating to a person remote from said heater every position of said valve.

18. The device of claim 17 in which the valve means rotates in one direction only and in which the means to cause the valve to assume the several positions moves the valve means from "off" position direct to high position, whereby to facilitate initial ignition in the gas heater by reason of the high flow of gas.

19. The combination with a gas heater and its valve having several predetermined positions for controlling the flow of gas thereto, of manually operable means located remote from said valve for altering at will the position of the valve, and means operatively connected with said manually operated means for indicating to the operator while at said remote point which of the several positions the valve has taken.

20. The combination of: valve means adapted to control the flow of a fluid, said means being adapted to assume a high position, at which it may pass a relatively large flow of fluid, or a low position, at which it may pass a relatively small flow of fluid, or an "off" position, at which the flow of fluid may be entirely shut off; contacts controlled by the position of said valve means; electro-responsive means, remote from said valve means, for differently indicating to a person, remote from said valve means, every position of said valve means; electric conductors connecting said contacts with said electro-responsive means; electrically operated means; step-by-step mechanism by which said electrically operated means successively moves said valve means from one position to another, and means by which a person, remote from said valve means, may energize said electrically operated means.

21. A remote control valve comprising, in combination: valve including a casing member and a valve member therein adapted for intermittent rotation in one direction, through a definite, predetermined cycle of off and on positions to pass gas in different quantities; a plurality of contacts arranged for movement in timed relation with the valve member and positioned to correspond with the several open positions of the valve; a plurality of complementary contacts supported adjacent said first mentioned contacts to form an electric circuit by engagement therewith, said first and second mentioned contacts being positioned for successive engagements corresponding with the several open positions of the valve; a remote control mechanism adapted to progress automatically through a manually initiated cycle comprising a series of two movements, including a ratchet wheel operatively connected with the valve and a pawl operatively associated with the control mechanism, said control mechanism being arranged to move the valve one step in the valve cycle, from closed position to the first open position, from an open position to a subsequent open position, and from the last open position to closed position, and to correspondingly move said movable contacts.

22. In a heating system, the combination of: a gas burner having burner holes; a fuel pipe supplying the burner; a valve in the pipe adapted to move in a cycle from a closed position through a series of open positions and to close momentarily between said successive open positions, said burner and fuel pipe between the valve and burner providing sufficient reservoir capacity between the valve and the burner holes to provide flame-sustaining pressure during the momentarily closed position of the valve.

EL ROY L. PAYNE.